United States Patent Office 3,037,016
Patented May 29, 1962

3,037,016
B₁₂ COENZYMES AND PROCESSES FOR PREPARING THE SAME
Horace Albert Barker, Berkeley, Calif., assignor to The Regents of The University of California, Berkeley, Calif.
No Drawing. Filed Apr. 13, 1959, Ser. No. 805,728
16 Claims. (Cl. 260—211.5)

This invention is concerned generally with novel coenzymes having vitamin $B_{12}$-activity and with procedures for preparing them. More particularly, the invention relates to the new chemical compound, coenzyme $B_{12}$, and novel vitamin $B_{12}$-active analogs thereof, and to novel processes for producing these new coenzyme $B_{12}$ compounds by controlled bacteriological synthesis and degradation of the resulting bacterial cell material. These novel vitamin $B_{12}$-active coenzyme $B_{12}$ compounds, which can be characterized by their property of activating the enzymatic conversion of glutamate to mesaconate via B-methylaspartate, are valuable as feed supplements and for the treatment of nutritional diseases. They are further valuable as growth-promoting agents and in biological investigations of essential enzymatic reactions involved in metabolism and maintenance of health.

Vitamin $B_{12}$, which possesses marked and effective action in the therapeutic treatment of Addisonian pernicious anemia and other macrocytic anemias, may be chemically represented as follows:

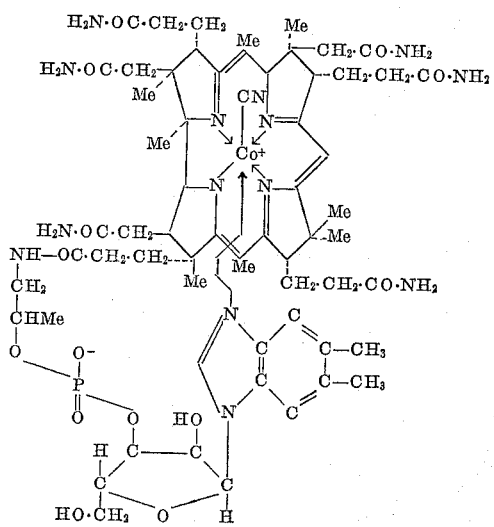

Consistent with this structure, vitamin $B_{12}$ and vitamin $B_{12}$-like compounds (which differ from vitamin $B_{12}$ in that the cyano radical attached to the cobalt atom is replaced by a different grouping, and which are convertible to vitamin $B_{12}$ per se by treatment with cyanide ion) are called cobalamins; vitamin $B_{12}$ itself is referred to as cyanocobalamin; vitamin $B_{12}$-active compounds, in which the 5,6-dimethylbenzimidazole moiety present in the cobalamins (which acts as a bridge between the ribose and corphyrin portions of the molecule) is replaced by another nucleotide base, are herein referred to as vitamin $B_{12}$ analogs.

The vitamin $B_{12}$-active coenzyme $B_{12}$ compounds, subject of the present invention, are structurally similar to vitamin $B_{12}$ and those of its cyano analogs, in which the nucleotide base is a benzimidazole compound (such as benzimidazole, 5,6-dimethylbenzimidazole and 5-hydroxybenzimidazole) but differ from these vitamins $B_{12}$ compounds in lacking a cyano group and in possessing an adenine moiety attached to the corphyrin portion of the molecule. These novel vitamin $B_{12}$-active coenzyme $B_{12}$ compounds as, for example, coenzyme $B_{12}$ (which contains 5,6-dimethylbenzimidazole as the nucleotide base and which is convertible to vitamin $B_{12}$ by treatment with cyanide ion), benzimidazole-coenzyme $B_{12}$, hydroxybenzimidazole-coenzyme $B_{12}$, and the like, are potent growth-promoting agents, and are valuble in nutrition and in the treatment of nutritional diseases. As the first coenzymes of the vitamin $B_{12}$-active group, these new coenzyme $B_{12}$ compounds are particularly valuable to biochemical and medical research workers in connection with investigations of essential enzyme reactions involved in normal metabolism and maintenance of health, as well as in studies of abnormal metabolic processes characteristic of certain diseases. The vitamin $B_{12}$-active coenzyme $B_{12}$ compounds can be characterized by their property of supporting the growth of Ochromonas malhamensis and by their ability to activate the enzymatic conversion of glutamate to mesaconate via β-methylaspartate.

These coenzyme $B_{12}$ compounds are produced by fermenting, with a vitamin $B_{12}$-activity producing microorganism, an aqueous nutrient medium containing, where indicated, the benzimidazole precursor corresponding to the coenzyme $B_{12}$ compound desired. As the vitamin $B_{12}$-activity producing organism, selected strains of microorganisms belonging to the Schizomycetes are ordinarily employed, particularly certain strains of the genus Streptomyces, the genus Bacillus, the genus Propionibacterium, the genus Alcaligenes, the genus Pseudomonis, the genus Mycobacterium, and the genus Clostridium, preferably strains selected from the species Streptomyces griseus, Streptomyces albidoflavus, Streptomyces fradiae, Streptomyces venezuelae, Bacillus megaterium, Propionibacterium shermanii, Propionibacterium freudenreichii, Propionibacterium arabinosum, Alcaligenes faecalis, Pseudomonas aeruginosa, Pseudomonas fluorescens, Pseudomonas lumichroma, Mycobacterium smegmatis, Clostridium tetanomorphum, and the like. The benzimidazole precursor corresponding to the coenzyme $B_{12}$ compound desired is ordinarily incorporated in the nutrient medium prior to fermentation, although many vitamin $B_{12}$-activity producing genera (for example Streptomyces, Bacillus, Propionibacterium, Pseudomonas and Mycobacterium) produce substantial yields of coenzyme $B_{12}$ per se, utilizing nutrient mediums not containing added 5,6-dimethylbenzimidazole.

The vitamin $B_{12}$-activity producing microorganisms utilized in producing the new coenzyme $B_{12}$ compounds are conveniently selected by testing their fermentation broths, using the protozoan Ochromonas malhamensis as the assay organism. A culture of the microorganism under investigation is diluted, plated out on a solid nutrient medium, and incubated to produce a considerable number of single-cell colonies. Individual colonies picked for inoculum development are separately grown in liquid nutrient mediums supplemented with cobalt nitrate at a concentration of 1 p.p.m. and with 5,6-dimethylbenzimidazole at a concentration of 0.0001 molar in suitable vessels and incubated either in presence or absence of oxygen, depending on the requirement of the organism. The fermentation broths are heated (where necessary) to coagulate the cells, and the resulting solution is assayed for Ochromonas malhamensis activity.

The basal medium employed for the growth of Ochromonas malhamensis, which eliminates non-specific growth stimulants present in certain crude extracts to which the organism has proved susceptible, has the following composition:

| | | |
|---|---|---|
| Casein hydrolysate | g | 5 |
| Glucose | g | 10 |
| Diammonium hydrogen citrate | g | 0.8 |
| $KH_2PO_4$ | g | 0.3 |
| $MgSO_4 \cdot 7H_2O$ | g | 0.2 |
| $CaCO_3$ | g | 0.15 |
| Ethylenediamine tetra-acetic acid | mg | 50 |
| $MnSO_4 \cdot H_2O$ | mg | 61.5 |
| $ZnSO_4 \cdot 7H_2O$ | mg | 110 |
| $FeSO_4 \cdot 7H_2O$ | mg | 10 |
| $CoSO_4 \cdot 7H_2O$ | mg | 3 |
| $CuSO_4 \cdot 5H_2O$ | mg | 0.4 |
| $H_3BO_3$ | mg | 0.6 |
| KI | mg | 0.01 |
| $Na_2MoO_4 \cdot 2H_2O$ | mg | 50 |
| DL-tryptophane | mg | 100 |
| DL-methionine | mg | 200 |
| L-cystine | mg | 100 |
| Choline chloride | mg | 2 |
| Inositol | mg | 10 |
| p-Aminobenzoic acid | mg | 1 |
| Thiamine | mg | 2 |
| Biotin | μg | 10 |
| Tween 80 [1] | mg | 1 | pH adjusted to 5.5.
Distilled water to 200 ml.

[1] A polyoxyethylene derivative of sorbitol mono-oleate suitable for use in microbiological cultures.

The test organism is maintained in the basal medium diluted 1 part of medium to 5 parts distilled water and supplemented with 0.2 mμg. cyanocobalamin/ml. The diluted medium is dispensed in 10 ml. amounts into 50 ml. conical flasks, which are then plugged and sterilized by autoclaving for 15 minutes at 10 lb./in.² pressure. The organism is transferred in this medium at 5-day intervals, and incubated in a cabinet at approximately 27° C., 1 ft. below a 60 w. tungsten filament lamp. After 5 days' incubation under these conditions the cell population density in the cultures reaches approximately 5,000,000 cells/ml. For inoculum, a 5-day culture is diluted 1:10 with sterile basal medium diluted 1:5, and 0.5 ml. is added to each assay tube.

Assays are set up in 19 x 150 mm. optical matched Pyrex test tubes. A standard solution of cyanocobalamin containing 0.2 mμg./ml. is added to paired tubes at levels of 0.25, 0.5, 1.0, 2.0 and 4.0 ml. Test extracts of fermented broth are added to paired tubes at the same levels (following a preliminary experiment to determine whether the broth has any *Ochromonas malhamensis* activity and the approximate value of this activity), and water is added to the tubes to bring their fluid content to 4 ml. To each of the tubes is then added 1 ml. of the undiluted basal medium, the tubes are plugged with cotton, and autoclaved for 10 min. at 10 lb./in.² pressure. The tubes are then cooled, inoculated with 0.5 ml. of the 5-day diluted culture referred to hereinabove, placed in a shaking machine in an incubator at 29° C. and shaken in darkness for 72 hours. The tubes are then autoclaved, 5 ml. water are added to each, and the growth in each tube is determined turbidimetrically in a Klett-Summerson colorimeter using a 540 millimicron filter.

Since the size of the inoculum is constant for each tube, the growths obtained in the control and test cultures are proportional to the concentration of vitamin $B_{12}$-active substances contained therein. Comparison of the growth of the test culture with that in the controls gives a quantitative measure of the concentration of vitamin $B_{12}$-active substances (expressed as mμg. of cyanocobalamin/ml.) in the test cultures and, by a simple calculation, the precise content of vitamin $B_{12}$-active substances in the fermented broth taken from the original fermentation vessels.

From the above test, it is possible to determine whether a given microorganism is potentially capable of synthesizing vitamin $B_{12}$-active coenzyme $B_{12}$ compounds, as well as the amount of vitamin $B_{12}$-active substances contained in the cells and fermentation broth obtained when said microorganism is used to ferment an aqueous nutrient medium.

The bacteriological production of the presently-invented coenzyme $B_{12}$ compounds is conducted utilizing aqueous nutrient mediums ordinarily employed in the propagation of microorganisms. The usual nutrients include an energy source, a carbon source, a nitrogen source, inorganic salts, and growth factors when required. It is preferred to supplement the medium with a source of cobalt, such as cobalt nitrate; in addition, the appropriate benzimidazole precursor (e.g., benzimidazole; 5-hydroxybenzimidazole; 5,6-dimethylbenzimidazole) is ordinarily incorporated in the medium, although no added precursor is required for producing coenzyme $B_{12}$ per se using many vitamin $B_{12}$-activity producing genera, as noted hereinabove. The carbon and energy can be provided by a carbohydrate such as dextrose, maltose, xylose, invert sugar, corn syrup, and the like, and by amino acids such as glutamic acid (in the form of its neutral salts). The nitrogen can be provided by an ammonium salt, amino acids, proteins or protein degradation products, obtained from proteins such as soy beans, oats, yeast, yeast extracts, casein, meat, blood meal, protein meat and bone scrap, salmon meal, fish meals, fish solubles, distillers solubles, and the like. If desired, the microorganisms can be propagated using proteins or protein degradation products without any carbohydrate being present in the medium, in which case the proteins serve as the source of energy, carbon and nitrogen required by the microorganism.

The aqueous nutrient medium is sterilized and inoculated with a culture of the selected microorganism strain, and the mixture is incubated under conditions appropriate to the particular microorganism employed. Since the coenzyme $B_{12}$ compounds are extremely sensitive to decomposition on exposure to visible light, all operations involved in the production of these compounds are conducted in the substantial absence of light. It may be noted that coenzyme $B_{12}$ compounds are not obtained in accordance with the methods utilized heretofore for obtaining vitamin $B_{12}$ compounds, since those methods not only failed to provide effective protection from light, but also conventionally involved treatment with cyanide ion and/or acidification to pH 3, thus precluding the preparation of the coenzyme which is highly unstable in the presence of cyanide or acid. The fermentation is allowed to proceed for a time sufficient for the bacterial cells to reach maximum growth, at which time the fermented mixture is centrifuged or filtered, the supernatant solution is discarded, the cellular material is recovered as a paste and subjected to degradation to produce the coenzyme $B_{12}$ compound. Alternatively the fermented mixture is heated or allowed to undergo lysis, thereby producing a solution of the coenzyme $B_{12}$ compound in the fermentation broth; avoidance of cyanide and/or acid, and protection from light are essential in this operation as well as in all subsequent treatments if the coenzyme $B_{12}$ compound is to be obtained. The former method, where the cells are separated from the fermented mixture and then subjected to degradation, results in the production of a relatively concentrated aqueous solution of the coenzyme $B_{12}$ compound which is substantially free from impurities present in the original broth; the latter method, which produces a relatively dilute and impure solution of the coenzyme in the whole broth, has the advantage of avoiding the difficult separation of the cellular material from the broth.

The degradation of the cellular material (where the cell paste is separated from the broth) is conveniently conducted by heating the diluted aqueous cell paste preferably at a temperature within the range of approximately 70–100° C., although higher or lower temperatures may be employed if desired; the heating is continued for a time sufficient to coagulate the cellular material, e.g., about 2 to 20 minutes at 100° C. Alternatively, the cells are subjected to the action of an alcoholic solution as, for example, a solution of a lower alkanol such as methanol, ethanol, propanol, and the like, having a concentration in water within the range of approximately 70–100%. It is ordinarily preferred to mix the aqueous cell paste separated from the fermented mixture with enough ethanol to give a final ethanol concentration of about 80%. Irrespective of the method utilized in coagulating and precipitating the cellular material, there is obtained, following separation of precipitated cells, a solution of the coenzyme $B_{12}$ compound; this solution (where alcohol is present) is then subjected to distillation in vacuo, thereby evaporating the alcohol. The aqueous solution of the coenzyme is then passed through a cation exchange resin (preferably a sulfonic acid type resin such as Dowex-50, 8x, manufactured by the Dow Chemical Co.) in the sodium form, thereby absorbing cationic substances from the solution; the eluate is then passed through an anion exchange resin containing quaternary ammonium groupings (such as the Dowex-2, 8x, resin manufactured by the Dow Chemical Co.) in the hydroxide or acetate form, thereby absorbing anionic substances including acidic nucleotides and amino acids. The resulting eluates and washings are combined and adjusted to pH 6.5–7.0, conveniently with 1 N acetic acid solution.

The resulting solution is then extracted with an hydroxylated organic solvent characterized as being partially immiscible with water as, for example, a phenolic solvent such as phenol or cresol, an alkanol such as butanol, amyl alcohol, and the like, or a mixture of such hydroxylated solvent and a hydrophobic solvent, as for example a hydrocarbon solvent such as benzene, toluene, a chlorinated hydrocarbon solvent such as ethylenedichloride, trichlorethylene, and the like. There is added to the hydroxylated organic solvent extract a lower ketone such as acetone, methylethyl ketone, and/or a dialkyl ether such as ethyl ether, dipropyl ether, and the like, thereby forming an upper organic layer containing the hydroxylated organic solvent and a lower aqueous phase containing the coenzyme. It is ordinarily preferred to utilize phenol as the hydroxylated organic extracting solvent and to add to the phenolic extract a 1:3 mixture of acetone-ether. The organic layer is extracted with water until the aqueous extract is virtually colorless. The combined aqueous extracts are washed with a substantially water-immiscible solvent such as ether to remove hydroxylated organic solvent, and the aqueous layer is distilled in vacuo, thereby evaporating ether remaining in the aqueous phase and forming a relatively concentrated aqueous solution of the coenzyme $B_{12}$ compound.

This solution, the color of which (depending on the concentration of the coenzyme $B_{12}$ compound) varies between orange and red, is then passed into a column of a weakly acidified (pH approximately 3) cation exchange resin, preferably of the sulfonic acid type, in the mixed sodium-hydrogen form; as the resin, it is preferred to use a copolymer of styrene in which the divinylbenzene component is between 1 and 4%. (A commercially-available resin of this type is manufactured by the Dow Chemical Co. under the trade name Dowex 50W–2x.) Resins containing higher cross-linking have proved less satisfactory. The resin is adjusted to pH approximately 2.5 to 3.5 (mixed $Na^+$—$H^+$ form) at which pH coenzyme $B_{12}$ compounds have a positive charge and are adsorbed on the resin; the free vitamin $B_{12}$ compounds in the cyano form (which are substantially neutral) are not appreciably adsorbed at this pH. The solution of coenzyme $B_{12}$ compound is rinsed into the column and the coenzyme is adsorbed to form a thin orange-red band at the top of the column. (All observations as to color of solutions and of bands of material adsorbed on columns are made with dim light and with minimal time of exposure to avoid substantial decomposition of the coenzyme $B_{12}$ compound.)

The resin column is then subjected to differential elution with buffer solutions of gradually decreasing acidity containing $Na^+$ as the competing ion. It is ordinarily preferred to employ solutions of sodium acetate within the range 0.01 to 0.2 molar, although other sodium buffer salts, e.g., sodium propionate, sodium phosphate, and the like, may be used if desired. The initial elution is preferably conducted with 0.03 M sodium acetate at pH 4.6 to 4.8; when about 5–6 column volumes of eluate have been collected, the eluting solution is changed to 0.03 M sodium acetate at pH 5.4 to 5.6 and an additional 10 column volumes of eluate is collected. (The properties of the coenzyme $B_{12}$ compounds are such that they are not appreciably eluted under the above conditions, and the initial elution at pH 4.6 to 4.8 can be omitted if desired since impurities eluted at pH 4.8 are also eluted at pH 5.6.) The column is then eluted with 0.03 M sodium acetate at pH 6.0–7.2 whereby the coenzyme $B_{12}$ compound is substantially completely eluted from the column.

The primary property described herein for selection of those fractions of the eluate which contain the coenzyme $B_{12}$ compounds is the property of these compounds of absorbing light in the region of 260 mu, at which wave length coenzyme $B_{12}$ compounds have their maximum absorbance. Thus, the absorbance values of the individual eluate fractions collected from the chromatogram are measured and plotted as a function of the fraction number. On such a plot, each particular compound elutes at maximum concentration in a particular tube, and the concentration and the absorbance of the earlier and later tubes are progressively lower; this necessarily results in an absorbance "peak." The absorbance peaks observed in this procedure may correspond to fractions which are colorless or variously colored. Only those peak fractions (using the 260 mu wave length) which are orange or red in color contain coenzyme $B_{12}$ compounds in substantial concentrations.

The further selection of the fractions containing coenzyme $B_{12}$ compounds from amongst the red or orange colored peak fractions is based upon the determination of coenzyme activity using the glutamate-mesaconate spectrophotometric coenzyme assay and upon the determination of the entire ultra violet and visible absorption spectrum of the fractions.

The glutamate-mesaconate spectrophotometric coenzyme assay is based on the observation that the rate of formation of mesaconate from glutamate by suitable enzyme preparations of *Clostridium tetanomorphum* strain H1 is dependent upon the concentration of coenzyme $B_{12}$ compounds in the reaction mixture. Under suitable conditions, defined below, the rate of mesaconate formation in the assay system is substantially proportional to the concentration of a particular coenzyme $B_{12}$ compound.

The assay depends upon the following chemical reactions catalyzed by suitable enzyme containing extracts of *C. tetanomorphum*:

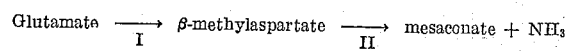

The formation of mesaconate is detected by an increase in ultra violet light absorption at wave lengths below 300 mu. A wave length of 240 mu is convenient to use for this purpose. The rate of mesaconate formation is measured by the rate of change of absorbance at 240 mu, determined with a spectrophotometer with silica cells capable of measuring absorbance at wave lengths below 300 mu. The absorbance is expressed in units which equal the log of the incident light intensity divided by the intensity of the transmitted light.

Extracts containing enzyme suitable for the assay are prepared as follows: 15 g. of cell paste of *C. tetanomorphum* strain H1, freshly harvested from a 0.1 M glutamate —0.3% yeast extract medium, are suspended in 30 ml. of 0.02 M potassium phosphate buffer pH 7.6 containing 0.07 M-mercaptoethanol. All subsequent operations in the preparation of the enzyme extract are carried out at 0–5° C. Approximately 3 g. of grade FFF corundum powder and 5 g. of moist, acid-washed activated charcoal Nuchar are added and the suspension is exposed to sonic vibration in a Raytheon 10 kc. sonic oscillator for 10 minutes at 0–5°, thereby disrupting the cells. The suspension is then centrifuged for 10 minutes at $16,000 \times g$ and the sediment is discarded. To 34 ml. of the supernatant solution, 20 ml. of 1% (w./v.) protamine sulfate (Nutritional Bioch. Corp.) is added slowly with mechanical stirring, in order to remove nucleic acids. After stirring for 5 minutes the precipitate is removed by centrifugation at $16,000 \times g$. Small aliquots of the clear supernatant solution, containing 20 to 25 mg. of protein per ml., are placed in small plastic tubes and immediately frozen. When stored at —10° C., the enzyme system retains much of its activity for several months. Repeated thawing and freezing of the enzyme solution and storage at 0° C. results in rapid loss of activity. For this reason the enzyme solution is divided, before being frozen, into small aliquots sufficient for the assays to be performed each day.

When the enzyme extract is prepared in the absence of charcoal, the resulting extract catalyzes both Reactions I and II. However, when the extract has been treated with a suitable charcoal adsorbent either during or after the breaking of the cells, the coenzyme $B_{12}$ compounds normally present in such extracts are adsorbed by the charcoal and thus removed from the extract. Such charcoal-treated extracts catalyze Reaction II, but they cannot catalyze Reaction I at a significant rate unless some coenzyme $B_{12}$ compound is added.

The reaction mixture contains per ml., 0.01 M monosodium L-glutamate, 0.05 M tris(hydroxymethyl)aminomethane chloride buffer pH 8.02, 0.01 M KCl, 0.001 M $MgCl_2$, 0.05 ml. of a charcoal- and protamine-treated enzyme preparation (see above) and sufficient coenzyme to give an absorbance change of 0.01 to 0.08 unit per minute at 240 mu corresponding to the formation of 0.0026 to 0.021 μmole of mesaconate per minute. The reaction is started by the addition of enzyme and readings are taken at 0.5 minute intervals for three minutes. The rate of reaction is calculated from the change in absorbance during the last two minutes. The reference cell contains sufficient mesaconate, usually about $4 \times 10^{-4}$ M, so that the absorbance of the reaction mixture falls between 0 and 0.5.

The rate of mesaconate formation as measured by the rate of absorbance change under the assay conditions is approximately proportional to the concentration of coenzyme $B_{12}$ compound over the limited range indicated above. The corresponding range of concentrations of the coenzyme $B_{12}$ compound differs with different forms of the coenzyme. With coenzyme $B_{12}$ per se the useful range is approximately $2 \times 10^{-7}$ M to $2 \times 10^{-6}$ M, whereas for benzimidazole-coenzyme $B_{12}$ (whose coenzyme activity is about 60 times that of coenzyme $B_{12}$) it is approximately $4 \times 10^{-9}$ M to $4 \times 10^{-8}$ M.

The coenzyme activity in the glutamate-mesaconate spectrophotometric coenzyme assay is expressed in units of absorbance change per minute under the assay conditions. One activity unit is the amount of coenzyme that causes an absorbance change of one absorbance unit per minute. The activity unit does not have an absolute value because the activity of the charcoal-treated enzyme extract differs from one preparation to another. Therefore the activity unit has a relative value which is determined in relation to the activity of a standard sample of coenzyme under identical assay conditions. A convenient reference standard is a solution of a purified sample of the benzimidazole-coenzyme $B_{12}$ of known concentration, although any coenzyme sample of known concentration can be used as the standard, if desired. The relative activity of the unknown sample is determined with respect to the reference sample by direct comparison in this glutamate-mesaconate spectrophotometric coenzyme assay.

The glutamate-mesaconate spectrophotometric coenzyme assay is employed not only for determining coenzyme $B_{12}$ compounds in fractions from the chromatogram, but is also used to assay for coenzyme $B_{12}$ compound-activity at various stages in the purification including direct extracts of disrupted cell paste. The determination of coenzyme $B_{12}$ compound-activity in such cell paste extracts provides a convenient method for selecting microorganisms suitable for coenzyme preparation. A convenient method for determining extractable coenzyme activity in disrupted microorganism cell paste is to suspend 50 mg. of the cell paste in 1 ml. of 0.01 M sodium acetate buffer, pH 6.0 and heating the suspension in a boiling water bath for 5 minutes. The mixture is rapidly cooled to 0° C. and centrifuged for 5 minutes at $16,000 \times g$ and aliquot of the color supernatant solution is then assayed in the glutamate-mesaconate spectrophotometric coenzyme assay.

In unfractionated extracts of microbial cells, compounds are sometimes present that cause a non-specific absorbance change in the glutamate-mesaconate spectrophotometric coenzyme assay. The presence of such compounds may be detected and a suitable correction found by doing a control assay in which glutamate is omitted from the assay mixture. An additional correction should also be made for the small absorbance change that sometimes occurs in the absence of added coenzyme.

As noted hereinabove, this gluamate-mesaconate spectro-photometric coenzyme assay facilitates the selection of those eluate fractions from chromatogram which contain coenzyme $B_{12}$ compounds. The further selection of eluate fractions containing coenzyme $B_{12}$ compounds in a state of high purity is achieved by determining the apparent specific-coenzyme-activity of the active fractions. By "specific-coenzyme-activity" is meant the ratio of the activity as determined on a particular sample divided by the absorbance of that sample at 260 mu. Since the absorbance at 260 mu is determined by certain impurities as well as by concentration of coenzyme $B_{12}$ compounds, the ratio of activity to absorbance (specific-coenzyme-activity) gives a quantitative measure of the purity of the coenzyme $B_{12}$ contained in the fraction; thus, fractions having a constant value for specific-coenzyme-activity can be assumed to be free of inactive impurities absorbing at 260 mu.

The specific coenzyme activity provides a convenient method for characterizing coenzyme $B_{12}$ compounds and is particularly effective for distinguishing between the benzimidazole coenzyme $B_{12}$ and coenzyme $B_{12}$, since the specific activity of the former is approximately 60 times that of the latter.

The fractions are further characterized by determination of the ultra violet and visible absorption spectrum in order to establish whether the coenzyme $B_{12}$ compound (demonstrated in the previous tests to be present in such fractions in relatively pure form) is the desired coenzyme $B_{12}$ compound. The spectra of the coenzyme $B_{12}$ compounds are similar in lacking the prominent absorbance peak in the 350–367 mu region which is characteristic of all previously known vitamin $B_{12}$ compounds. While the spectra of the coenzyme $B_{12}$ compounds are generally similar, they can readily be distinguished from one another. For example, the adenine-coenzyme $B_{12}$ differs markedly from the benzimidazole-coenzyme $B_{12}$ compounds in having a prominent absorbance maximum at 458 mu, whereas the benzimidazole-coenzyme $B_{12}$ compounds have a comparable absorbance maximum at about 520 mu. Also, the spectrum of benzimidazole-coenzyme $B_{12}$ has an inflection at 280 mu, whereas the spectrum of coenzyme $B_{12}$ (containing 5,6-dimethylbenzimidazole) has an inflection at 287 mu.

The homogeneous fractions from the column containing a pure coenzyme $B_{12}$ compound are now combined, desalted by extraction into a phenolic solvent and reextracted back into water to give a salt-free concentrated aqueous solution of the pure coenzyme $B_{12}$ compound. Such a solution may be used in the preparation of the crystalline coenzyme either by slow evaporation or by addition of acetone or other organic solvent in which the coenzyme $B_{12}$ compound is relatively insoluble. Alternatively, this solution can be used directly as a substantially pure form of the coenzyme $B_{12}$ compound for nutritional purposes or for metabolic studies.

In accordance with the foregoing procedure, and utilizing vitamin $B_{12}$-activity producing Schizomycetes in conjunction with a benzimidazole compound as precursor, there are obtained vitamin $B_{12}$-active coenzyme $B_{12}$ compounds containing a benzimidazole or similar nucleus, as for example coenzyme $B_{12}$ (which contains the 5,6-dimethylbenzimidazole) benzimidazole-coenzyme $B_{12}$, 5-hydroxy-benzimidazole-coenzyme $B_{12}$, 5-amino-benzimidazole-coenzyme $B_{12}$, 5-nitro-benzimidazole-coenzyme $B_{12}$, 5-methyl-benzimidazole-coenzyme $B_{12}$, and the like. Other vitamin $B_{12}$-active coenzyme $B_{12}$ compounds containing heterocyclic compounds other than the benzimidazoles attached to the ribose may be likewise produced utilizing vitamin $B_{12}$-activity producing Schizomycetes in conjunction with the appropriate heterocyclic compound as precursor. These vitamin $B_{12}$-active coenzyme $B_{12}$ compounds may be administered for their nutritional effect as such or in the form of their solutions in pharmacologically accepted liquid diluents, such as water, or in admixture with pharmaceutical carriers or as feed supplements in admixture with pharmacologically accepted feed additives, and the like.

The coenzyme $B_{12}$ compounds produced in accordance with this invention differ from the vitamin $B_{12}$ compounds by containing an adenine moiety in addition to the heterocyclic base attached to ribose in the vitamin $B_{12}$ compounds. The spectra of these coenzyme $B_{12}$ compounds differ greatly from the spectra of the corresponding $B_{12}$ vitamins by having a peak with the highest extinction coefficient at approximately 260 mu, and by lacking the prominent peak with a high extinction coefficient in the 350–367 mu region which is characteristic of all of the previously known vitamin $B_{12}$ compounds. The coenzyme $B_{12}$ compounds are readily decomposed by exposure to visible light or by exposure to cyanide ion. Either of these treatments results in progressive and finally complete loss of coenzyme activity. Either exposure to light or to cyanide ion causes removal of adenine or an adenine derivative from the coenzyme.

A comparison of some properties and certain structural features of coenzyme $B_{12}$, benzimidazole coenzyme $B_{12}$, and vitamin $B_{12}$ are set forth in the following table:

|  | Coenzyme $B^{12}$ | | Benzimidazole-Coenzyme $B^{12}$ | | Vitamin $B_{12}$ | |
| --- | --- | --- | --- | --- | --- | --- |
|  | Max. mu | $E^{0.001 M}_{1 cm.}$ | Max. mu | $E^{0.001 M}_{1 cm.}$ | Max. mu | $E^{0.001 M}_{1 cm.}$ |
| Absorption Spectrum in 0.03M NaAc pH 6.7 | 260 | 35.5 | 261 | 35.5 | 278 | 15.6 |
|  |  |  | 303–305 | 12.8 |  |  |
|  | 315 | 12.8 | 315 | 12.8 |  |  |
|  | 335–337 | 12.5 |  |  |  |  |
|  |  |  |  |  | 361 | 27.8 |
|  | 375 | 9.9 | 375 | 9.9 |  |  |
|  | 523 | 7.5 | 520 | 7.5 |  |  |
|  |  |  |  |  | 550 | 8.6 |
| Inflections | 287 | | 280 | | | |
|  | 440–445 | | 440–445 | | | |
|  | 500 | | 500 | | | |

|  | Moles per Atom of Cobalt | | |
| --- | --- | --- | --- |
| Components: | | | |
| Benzimidazole | 0 | 1 | 0 |
| 5,6-Dimethyl-benzimidazole | 1 | 0 | 1 |
| Adenine | 1 | 1 | 0 |
| Ribose | 1 | 1 | 1 |
| Phosphate | 1 | 1 | 1 |
| Cyanide | 0 | 0 | 1 |
| Charge at pH 4.8 | + | + | 0. |
| Molecular Weight | 1,500–1,700 | 1,500–1,700 | 1,365. |
| Coenzyme Activity | 1.7 | 100 | None. |
| Ochromonas Malhamensis Activity | + | + | +. |
| Stability in Cyanide Solution. | Converted to dicyanocobalamin. Coenzyme activity lost. Adenine removed. | Converted to dicyanobenzimidazole cobamide. Coenzyme activity lost. Adenine removed. | Converted to dicyano form. |
| Stability in Light | Converted to hydroxocobalamin, or very similar cpd. Coenzyme activity lost. Adenine removed (as derivative). | Converted to hydroxobenzimidazole cobamide, or very similar cpd. Coenzyme activity lost. Adenine removed (as derivative). | CN slowly lost. |

EXAMPLE 1

A culture medium for the production of the benzimidazole-coenzyme $B_{12}$ is prepared as follows: A sterile 20 liter Pyrex bottle is filled with 14 liters of distilled water at 35–37° C. To this are added 4 liters of sterile solution A and 700 ml. of sterile solution B, the compositions of which are described hereinbelow, 200 ml. of sterile 4 M glucose and 200 ml. of $10^{-2}$ M benzimidazole. The bottle is then rotated to mix the contents, 0.6 g. of dry (non-sterile) sodium hydrosulfite ($Na_2S_2O_4$) is added, and the contents again mixed.

Sterile Solution A.—Preparation and Sterilization

| | | |
|---|---|---|
| Basamin (Anheuser Busch yeast extract) | g | 500 |
| Accent (monosodium glutamate) | g | 2700 |
| $MgSO_4$, 2 M | ml | 80 |
| $FeSO_4$, 0.2 M | ml | 32 |
| $MnCl_2$, 0.1 M | ml | 16 |
| $Na_2MoO_4$, 0.1 M | ml | 16 |
| $CoCl_2$, 0.1 M | ml | 32 |
| $CaCl_2$, 1 M | ml | 16 |

Distilled water to 32 liters.

To sterilize, place 4 liters of this solution in a 6-liter flask and sterilize for 45 minutes at 18 lb. steam pressure.

Sterile Solution B.—Preparation and Sterilization

| | | |
|---|---|---|
| $KH_2PO_4$ (reagent grade) | g | 170 |
| $K_2HPO_4 \cdot 3H_2O$ (reagent grade) | g | 1,200 |

Distilled water to 5.6 liters.

To sterilize, place 700 ml. of this solution in a liter flask and sterilize for 45 minutes at 18 lb. steam pressure.

This medium is then inoculated with 750 ml. of an actively fermenting pure culture of a vitamin $B_{12}$- activity producing strain of *Clostridium tetanomorphum* (strain H1 which produces vitamin $B_{12}$ active compounds when grown in a medium containing 5,6-dimethylbenzimidazole) prepared by inoculating 5 ml. of a semisolid agar (0.2%) culture of the bacteria into solution A supplemented with 0.05% of cysteine·HCl neutralized to pH 7 and incubating this for 18–24 hours at 37° C. The 20-liter bottle is then filled with distilled water and incubated at 35–37° C. until the culture reaches maximum turbidity indicating maximum growth. This usually requires from 15–20 hours, depending on temperature and condition of the inoculum, and corresponds to a reading of 20 to 25 (2—log $g$=0.6 to 0.7) on an Evelyn colorimeter using 18.0 mm. O.D. tubes and a 540 mu (green) filter after correcting for the absorbance of the uninoculated medium.

The bacteria are then harvested by centrifugation at 20,000× $g$. The 3–4 g. of cell paste per liter of medium thus obtained were placed in a wide mouthed polyethylene container, immediately frozen in a Dry Ice-alcohol mixture and stored at or below −10° C. until the isolation-purification procedure could be performed. The foregoing operation is carried out repeatedly to produce a total of 3.86 kg. of cell paste.

An 83% ethanol extract is prepared from 1 kg. of cells at a time. Two liters of absolute ethanol are added to 1 kg. of thawed cell paste and the mixture is homogenized for 30 seconds in a large Waring Blendor. The resulting suspension is poured into 2 liters of boiling 95% ethanol. The mixture is heated to boiling, allowed to stand at this temperature for 15 minutes and then filtered while hot through a layer of diatomaceous silica on 2 large Büchner funnels. The residue on the filter is sucked dry and resuspended in 2 liters of 80% ethanol. The suspension is filtered as before. The combined filtrates from 3.86 kg. of cells are combined and concentrated in vacuo to about 800 ml. To remove residual ethanol, 1.5 liters of distilled water is added and the solution is again concentrated to about 1 liter.

The resulting solution is turbid and a slimy precipitate forms after the solution is frozen and thawed. To remove the precipitate, which tends to clog the ion exchange resin columns subsequently used, 10 ml. of 1 M $ZnSO_4$ and 20 ml. of 1 N NaOH are added per liter of solution and after standing 5 minutes the resulting precipitate is removed by filtration through diatomaceous silica.

The clear solution is adjusted to pH 7 and passed by gravity flow through a 15 cm. high x 3.5 cm. diameter column of a resin copolymer of styrene and divinyl benzene containing sulfonic acid groups, 12% cross-linked, in the sodium ion form (Dowex 50, 50–100 mesh; Dow Chemical Company). The column is washed and sucked dry to recover the coenzyme completely. The final volume is about 2 liters.

The solution is adjusted to pH 8.5 with 2 N NaOH and passed by gravity flow through a 15 cm. high x 3.5 cm. diameter column of an anion-exchange resin containing quaternary ammonium groups, 8% cross-linked in the hydroxide ion form (Dowex-2, 50–100 mesh; Dow Chemical Company). This requires about 3 hours. The column is washed with water and the combined effluents pH 9.7 are neutralized with 90 ml. of 1 M acetic acid to pH 6.3. The volume is approximately 2.2 liters.

*Phenol extraction.*—Each liter of solution is extracted with 120 ml. of 90% (w./v.) phenol-water, then twice with 40 ml. of phenol-water. The phases are separated by centrifugation. The phenol phase (120 ml.) is washed twice with 20 ml. water. The wash water is reextracted with 4 ml. phenol, the water is discarded and the phenol extracts are combined. To 125 ml. of phenol phases are added 375 ml. of ether, 125 ml. of acetone and 10 ml. of water. The mixture is shaken and centrifuged to separate the aqueous phase. The organic phase is reextracted twice with 10 ml. of water. The combined aqueous phase from 2.2 liters of Dowex-2 treated solution is extracted three times with 5 ml. of ether to remove phenol and is aerated with nitrogen to remove ether.

*Chromatographic purification.*—The aqueous solution from the phenol extraction operation (volume approximately 70 ml.) containing the partially purified benzimidazole-coenzyme $B_{12}$, is acidified to pH 3.2 with 7 ml. of 1 N aqueous hydrochloric acid solution. Since the calculated salt concentration is about 0.09 M, the solution is diluted 5-fold to give a final salt concentration below 0.02 M; lower salt concentrations favor adsorption of the coenzyme on the resin. The acidified and diluted solution is passed into a resin column prepared as follows: 2 M sodium phosphate-phosphoric acid buffer pH 2.5 is allowed to pass under gravity through a column of a sulfonic acid type cation-exchange resin which is a copolymer of styrene and divinylbenzimidazole containing free sulfonic acid groupings, 2% cross-linked, 200–400 mesh (Dowex-50W, 200–400 mesh; 2% cross-linked; Dow Chemical Co.), which is initially in the acid form, until the effluent has the same pH as the added buffer. The resin is then washed with distilled water until the effluent is free from phosphate. The washed resin, in the mixed sodium ion-hydrogen ion form, is used to make a 1 cm. diameter x 80 cm. high column. During passage into the column, the benzimidazole-coenzyme $B_{12}$ is adsorbed on the resin.

The column is then eluted with approximately 800 ml. of 0.03 M sodium acetate at pH 5.2 followed by about 1500 ml. of 0.03 M sodium acetate pH 6.2; individual 16 ml. fractions are collected throughout the elution and their absorbance at 261 mu measured. The elution of the benzimidazole-coenzyme $B_{12}$ which begins after approximately 400 ml. of the pH 6.2 buffer has passed through the column, and is completed when approximately 750 ml. of this buffer has passed through the column, is recognized by the appearance of an intensely reddish-orange color and by the appearance of a prominent and rather symmetrical 261 mu absorbance peak. The homogeneity of the coenzyme material eluted in the peak fractions is determined by comparing the coenzyme activity, as measured by the glutamate-mesaconate spectrophotometric coenzyme assay, with the absorbance of the various fractions; this is expressed as relative specific activity and is substantially constant for the central portion of the peak containing 80–90% of the total absorbance.

The peak fractions, which have (as noted) essentially constant specific activity, and which possess the type of spectrum characteristic of the coenzyme $B_{12}$ compound containing benzimidazole attached to ribose, are combined to give a total volume of approximately 280 ml. This solution contains approximately 53 umoles of benzimidazole-coenzyme $B_{12}$ (as determined by absorbance measurements at 261 mu and the estimated molar extinction coefficient of $35.5 \times 10^6$ cm.$^2$/mole at 261 mu), and in substantially pure form as indicated by the absorption spectrum.

The solution containing the benzimidazole-coenzyme $B_{12}$ and buffer salt is saturated with phenol and is extracted three times with 0.15 volume of 90% aqueous phenol. The combined phenol phase is washed twice with 0.05 volume of water (which is discarded), and then is diluted with 3 volumes of ethyl ether followed by 1 volume of acetone. The phenol-ether-acetone solution is extracted three times with 0.1 volume of water. The combined aqueous solution containing the coenzyme is extracted three times with ether to remove residual phenol and is then concentrated in vacuo to remove residual ether. The deep red aqueous solution, containing approximately 48 umoles of coenzyme in a volume of 8 ml. is placed in a vacuum desiccator over concentrated sulfuric acid as a desiccant. The desiccator is evacuated and the solution is allowed to concentrate at 3° C. to a volume of approximately 2 ml. during a period of several days. During concentration of the solution, crystallization of the coenzyme occurs. The mother liquor is decanted, the crystals adhering to the walls of the container are washed first with 90% acetone, then with 100% acetone, and finally with ethyl ether. After removal of ether in a vacuum desiccator there is obtained approximately 50–70 mg. of substantially pure crystalline benzimidazole-coenzyme $B_{12}$ in hydrated form.

The benzimidazole-coenzyme $B_{12}$ forms prismatic crystals having some diamond-shaped and some rectangular faces. The crystals are conspicuously dichroic, being either light yellow or deep red or a mixture of these colors. The diamond-shaped faces appear either yellow or red, depending on the angle of observation; the rectangular faces appear red. The absorption spectrum of an aqueous solution of this crystalline benzimidazole-coenzyme $B_{12}$ is substantially identical with the absorption spectrum of the peak column fractions from which the crystalline material is obtained. The specific coenzyme-activity of the dissolved crystalline benzimidazole-coenzyme $B_{12}$ is likewise substantially the same as that of the peak column fractions.

The ultra violet and visible absorption spectrum of crystalline benzimidazole-coenzyme $B_{12}$ hydrate (prepared in accordance with the foregoing procedure) dissolved in water showed maxima at 261, 315, 375, and 250 mu and the corresponding $$E_{1\ cm.}^{1\%}$$

values were 175, 68, 53, and 39; the spectrum had inflection points at 280, 440–445, and 500 mu. The cobalt content of this crystalline benzimidazole-coenzyme $B_{12}$ hydrate was found to be 3.1% corresponding to an apparent molecular weight of approximately 1900. This value includes an unknown amount of water of crystallization; the molecular weight of the anhydrous crystalline coenzyme, calculated on the basis of 1 mole of cobalt, is estimated to be within the range 1500–1700. Analysis of the benzimidazole-coenzyme $B_{12}$ showed that it contains per mole of cobalt approximately one mole each of benzimidazole, adenine, ribose and phosphate.

Treatment of the benzimidazole-coenzyme $B_{12}$ with 0.1 M KCN for approximately 30 minutes at room temperature results in complete loss of coenzyme activity and results in the formation of a compound which in the region between 300 mu and 650 mu has an absorption substantially identical with that of the dicyano form of vitamin $B_{12}$ with absorption peaks at 304 mu, 367 mu, 416 mu, 540 mu, and 579 mu.

Exposure of the benzimidazole-coenzyme $B_{12}$ to visible light, such as a 100 w. tungsten filament lamp at a distance of 1 foot for a period of 30 minutes results in virtually complete loss of coenzyme activity and results in the formation of a compound having an absorption spectrum very similar to that of hydroxocobalamin in the region between 320 mu and 600 mu and showing maxima at 350–355, 410 and 525 mu.

EXAMPLE 2

A culture medium for the production of coenzyme $B_{12}$, utilizing *Propionibacterium shermanii* as the vitamin $B_{12}$-activity producing microorganism, is prepared as follows: A sterile 20-liter Pyrex bottle is filled with 12 liters of distilled water at 30° C. To this are added 4 liters of sterile solution A, 700 ml. of sterile solution B, and 2 liters of sterile suspension C, the compositions of which are described hereinbelow, and sufficient sterile solution of sodium thioglycollate to give a concentrate in the culture medium of 0.05%. The bottle is rotated to mix the contents.

*Sterile Solution A.—Preparation and Sterilization*

| | |
|---|---|
| Basamin (Anheuser Busch yeast extract)_____g__ | 500 |
| Glucose _____g__ | 4800 |
| MgSO$_4$, 2 M_____ml__ | 80 |
| FeSO$_4$, 0.2 M_____ml__ | 32 |
| MnCl$_2$, 0.1 M_____ml__ | 16 |
| Na$_2$MoO$_4$, 0.1 M_____ml__ | 16 |
| CoCl$_2$, 0.1 M_____ml__ | 32 |
| CaCl$_2$, 1 M_____ml__ | 16 |
| Distilled water to 32 liters. | |

To sterilize, place 4 liters of this solution in a 6-liter flask and sterilize for 45 minutes at 18 lb. steam pressure.

*Sterile Solution B.—Preparation and Sterilization*

| | |
|---|---|
| KH$_2$PO$_4$ (reagent grade)_____g__ | 170 |
| K$_2$HPO$_4$·3H$_2$O (reagent grade)_____g__ | 1,200 |
| Distilled water to 5.6 liters. | |

To sterilize, place 700 ml. of this solution in a liter flask and sterilize for 45 minutes at 18 lb. steam pressure.

*Sterile Suspension C.—Preparation and Sterilization*

| | |
|---|---|
| Powdered CaCO$_3$_____g__ | 400 |
| Distilled water to 2 liters. | |

Sterilize by heating 45 minutes at 18 lb. steam pressure.

This medium is inoculated with 750 ml. of an actively fermenting pure culture of said vitamin $B_{12}$-activity producing strain of *Propionibacterium shermanii* prepared by inoculating 5 ml. of a culture of the bacteria into solution A supplemented with 0.05% cysteine·HCl and incubating this culture for 48–72 hours at 30° C. The 20-liter bottle is then filled with distilled water and incubated at 30° C. with stirring for a period of approximately 3–10 days. The pH of the medium is determined at frequent intervals and the pH is adjusted to pH 7, as required, by the addition of a solution of 2 N NaOH. In order to obtain more abundant growth, additional amounts of glucose are added at intervals as this compound is used up. At the end of the fermentation period, the cells are harvested by centrifugation and are obtained as a moist cell paste that can be used immediately for the preparation of coenzyme $B_{12}$ or, if desired, can be frozen and stored for later use.

All operations are carried out in the dark or in very dim light.

Four kilograms of cell paste of *Propionibacterium shermanii* (obtained in accordance with the foregoing procedure are extracted with approximately 21 liters of 80–90% ethanol at boiling temperature. The filtered extract is concentrated in vacuo (45–50° C.) to remove alcohol. The resulting aqueous solution (volume 1800 ml.) is adjusted to pH 7 with 2 N NaOH passed through a 2 cm. diameter x 36 cm. high column of a sulfonic acid type cation-exchange resin (Dowex–50, 8x, 20–40 mesh) in the sodium ion form. The solution is then adjusted to pH 9.4 by addition of 2 N NaOH and is passed through a 2 cm. diameter x 30 cm. column of a quaternary ammonium type anion-exchange resin (Dowex-2) in the hydroxide form. The combined effluent and washings (pH 9.8) are neutralized with glacial acetic acid to pH 6.2.

*Phenol extraction.*—The resulting solution (volume approximately 4 liters) is saturated with phenol and is extracted three times with 0.1 volume of 90% aqueous phenol, and the coenzyme is then displaced back into water by addition of 3 volumes of ethyl ether and 1 volume of acetone for each volume of phenol. The phenol-ether-acetone solution is extracted 3 times with 0.1 volume of water.

*Chromatographic purification.*—The resulting aqueous solution of coenzyme has a volume of approximately 600 ml. and a pH of about 7.0. The solution is acidified with 2 N HCl to pH 3.0. The solution is diluted with distilled water to 2 liters so that the final salt concentration is less than 0.02 M. The solution is then passed into a 2 cm. diameter x 80 cm. high column of a resin copolymer of styrene and divinyl benzene containing sulfonic acid groups in the mixed sodium ion-hydrogen ion form at pH 3 (Dowex-50K, 2x, 200–400 mesh; Dow Chemical Co.). The column is eluted successively at 3° C. with water (250 ml.) 0.03 M sodium acetate pH 5.5 (3,200 ml.) and 0.05 M sodium acetate pH 6.4 (3,600 ml.). The eluate is collected by means of an automatic fraction collector; each 10 minute fraction has a volume of approximately 25 ml. The coenzyme begins to elute after approximately 1 liter of pH 6.4 buffer has passed through the column. The elution of the coenzyme from the column is recognized by the appearance of a large absorbance peak at 260 mu, by the intense orange-red color of the eluate, and by the presence of coenzyme activity as indicated by the glutamate-mesaconate spectrophotometric coenzyme assay. The product is collected in approximately 40 fractions having a total volume of about 1 liter. From the 260 mu absorbance values and the estimated molar extinction coefficient of $35.5 \times 10^6$ cm.$^2$/mole, the total quantity of coenzyme $B_{12}$ compounds in the peak fractions is estimated to be approximately 500 $\mu$moles. The coenzyme activities of the peak fractions are determined by the spectrophotometric coenzyme assay and the relative specific activities of the fractions calculated from these activities and the absorbance measurements at 260 mu on the respective fractions. The ultraviolet and visible absorption spectra of selected peak fractions are also determined. On the basis of the specific activity determinations and absorption spectra, the peak fractions with uniform properties are selected and combined.

The resulting coenzyme solution is extracted into phenol by the method described hereinabove and is displaced back into water by the addition of ether and acetone as also previously described. The aqueous solution thus obtained is extracted several times with ether to remove phenol and is then concentrated in vacuo. The final solution, containing approximately 400 $\mu$moles of coenzyme $B_{12}$ in a volume of about 40 ml., is deep red in color. The coenzyme $B_{12}$ is crystallized by further concentrating the aqueous solution and allowing it to stand at 3° C. in the dark; or, alternatively, by adding to each volume of aqueous solution approximately 6 volumes of acetone and approximately 3 volumes of ether until the solution becomes slightly turbid and allowing the resulting mixture to stand at 3° C. until the coenzyme $B_{12}$ crystallizes. The crystals are washed with 90% acetone, then with 100% acetone, and finally with ether, and the ether evaporated in vacuo to produce substantially pure crystalline coenzyme $B_{12}$ in hydrated form.

The solution of coenzyme $B_{12}$ in .03 M sodium acetate pH 6.7 shows absorption maxima at 260, 315, 335–337, 375 and 520–523 mu and the corresponding molar extension coefficients ($\times 10^6$ cm.$^2$/mole) of 35.5, 12.8, 12.5, 9.9 and 7.5, respectively. Analysis of the coenzyme $B_{12}$ showed that it contains per mole of cobalt approximately one mole each of 5,6-dimethylbenzimidazole and adenine.

Treatment of the coenzyme $B_{12}$ with 0.1 M KCN for approximately 30 minutes at room temperature results in virtually complete loss of coenzyme activity and results in the formation of a compound which in the region between 300 mu and 650 mu has an absorption spectrum substantially identical with that of the dicyano form of vitamin $B_{12}$ with absorption peaks at 304 mu, 367 mu, 416 mu, 540 mu and 579 mu.

Exposure of the coenzyme $B_{12}$ to visible light, such as a 100 w. tungsten filament lamp at a distance of 1 foot for a period of 30 minutes, results in virtually complete loss of coenzyme activity and results in the formation of a compound having an absorption spectrum very similar to that of hydroxocobalamin in the region between 320 mu and 600 mu and showing maxima at 350–355, 310 and 525 mu.

EXAMPLE 3

A culture of *Clostridium tetanomorphum* strain H1 is grown in accordance with the procedure described in Example 1 hereinabove (except that 5,6-dimethylbenzimidazole in a concentration of $1 \times 10^{-4}$ M is used in place of the benzimidazole used in Example 1). The cells from 2 liters of fermented broth thus produced are harvested and treated in accordance with the phenol extraction and chromatographic purification method set forth in detail in Example 2 hereinabove, with suitable adjustment for the smaller quantities of starting material (approximately 8 g. cell paste—1/500 of the amount used in Example 2). The final aqueous solution obtained by combining the peak fractions from the elution of the coenzyme from the resin column, followed by extraction into phenol and displacement back into water, contains approximately 0.1 $\mu$mole of coenzyme $B_{12}$, as determined from the absorbance of its solution at 520 mu and the estimated molar extinction coefficient of $7.55 \times 10^6$ cm.$^2$/mole.

The identity of the coenzyme $B_{12}$ obtained in this example, with that obtained in Example 2 utilizing *Propionibacterium sharmanii*, is shown by the observation that they have the same absorption spectra; the same relative specific activity in the glutamate-mesaconate spectrophotometric assay; undergo the same spectral changes and loss of coenzyme activity when exposed to cyanide ion or to light; and possess approximately 1 mole each of adenine, and 5,6-dimethylbenzimidazole per atom of cobalt.

Various changes may be made in carrying out the present invention without departing from the spirit and scope thereof. In so far as these changes and modifications are within the purview of the annexed claims, they are to be considered as part of my invention.

Having thus described my invention, what I claim and desire to secure by Letters Patent is:

1. A coenzyme $B_{12}$ compound having a molecular weight within the range of about 1500 to 1700, a chemical structure like the cyano-benzimidazole-cobamides but lacking a cyano group and possessing an adenine moiety attached to the corphyrin portion of the molecule; characterized as being converted to the corresponding dicyano-benzimidazole-cobamide with removal of adenine and loss of coenzyme activity on treatment with cyanide ion and to the corresponding hydroxo-benzimidazole-cobamide-like compound with removal of adenine and loss of activity on exposure to light; characterized by the ultra violet and visible absorption spectrum of its solution in 0.03 M sodium acetate pH 6.7 as exhibiting a peak with the highest extinction coefficient at approximately 260 mu and lacking a prominent peak in the 350–367 mu region; and when in crystalline form being further characterized as forming prismatic crystals soluble in water, methanol, ethanol, and phenol, and substantially insoluble in acetone, ether and chloroform; said compound being further characterized as supporting the growth of the microorganism *Ochromonas malhamensis* and as having coenzyme activity as measured by the glutamatemesachonate spectrophotometric coenzyme assay.

2. The compound coenzyme $B_{12}$, an organic substance having vitamin $B_{12}$ activity and coenzyme activity as measured by the glutamate-mesaconate spectrophotometric coenzyme assay; having a molecular weight within the range of about 1500 to 1700 and a chemical structure like that of vitamin $B_{12}$ but lacking a cyano group and possessing an adenine moiety attached to the corphyrin portion of the molecule; characterized as being converted to dicyanocobalamin with removal of adenine and loss of coenzyme activity on treatment with cyanide ion and to a hydroxo-cobalamin-like compound with removal of adenine and loss of coenzyme activity on exposure to light; characterized by the ultra violet and visible absorption spectrum of its solution in 0.03 M sodium acetate pH 6.7 as exhibiting an inflection at 287 m$\mu$ and absorption maxima at 260 mu, 315 mu, 335–337 mu. 375 mu and 523 mu with corresponding molar extinction coefficients ($\times 10^6$ cm.$^2$/mole) of 35.5, 12.8, 12.5, 9.9 and 7.5 respectively, and as failing to exhibit a prominent absorption peak in the 350–367 mu region; and when in crystalline form being further characterized as forming prismatic crystals soluble in water, methanol, ethanol, and phenol, and substantially insoluble in acetone, ether and chloroform.

3. The compound benzimidazole-coenzyme $B_{12}$, an organic substance having vitamin $B_{12}$ activity and coenzyme activity as measured by the glutamate-mesaconate spectrophotometric coenzyme assay; having a molecular weight within the range of about 1500 to 1700 and a chemical structure like that of the benzimidazole analog of vitamin $B_{12}$ but lacking a cyano group and possessing an adenine moiety attached to the corphyrin portion of the molecule; characterized as being converted to dicyanobenzimidazole-cobamide with removal of adenine and loss of coenzyme activity on treatment with cyanide ion and to a hydroxobenzimidazolecobamide-like compound with removal of adenine and loss of coenzyme activity on exposure to light; characterized by the ultra violet and visible absorption spectrum of its solution in 0.03 M sodium acetate pH 6.7 as exhibiting an inflection at 280 mu and absorption maxima at 261 mu, 303–305 mu, 315 mu, 375 mu and 520 mu with corresponding molar extinction coefficients ($\times 10^6$ cm.$^2$/mole) of 35.5, 12.8, 12.8, 9.9 and 7.5 respectively, and as failing to exhibit a prominent absorption peak in the 350–367 mu region; and when in crystalline form being further characterized as forming prismatic dichroic crystals soluble in water, methanol, ethanol, and phenol, and substantially insoluble in acetone, ether and chloroform.

4. Coenzyme $B_{12}$ as defined in claim 2 in substantially purified form.

5. Benzimidazole-coenzyme $B_{12}$ as defined in claim 3 in substantially purified form.

6. Coenzyme $B_{12}$ as defined in claim 2 in the form of its crystalline hydrate.

7. Benzimidazole-coenzyme $B_{12}$ as defined in claim 3 in the form of its crystalline hydrate.

8. A process for the production of a vitamin $B_{12}$-active coenzyme $B_{12}$ compound of the character set forth in claim 1 which comprises growing an *Ochromonas malhamensis* and $B_{12}$ coenzyme-activity producing microorganism in an aqueous nutrient medium and disrupting the resulting bacterial cells in the substantial absence of light and cyanide ion.

9. A process for the production of coenzyme $B_{12}$ of the character set forth in claim 2 which comprises growing an *Ochromonas malhamensis* and $B_{12}$ coenzyme-activity producing microorganism in an aqueous nutrient medium and disrupting the resulting bacterial cells in the substantial absence of light and cyanide ion.

10. A process for the production of benzimidazole-coenzyme $B_{12}$ of the character set forth in claim 2 which comprises growing an *Ochromonas malhamensis* and $B_{12}$ coenzyme-activity producing microorganism in an aqueous nutrient medium containing benzimidazole and disrupting the resulting bacterial cells in the substantial absence of light and cyanide ion.

11. The process of claim 9 in which 5,6-dimethylbenzimidazole is incorporated in the nutrient medium.

12. A process for producing coenzyme $B_{12}$ comprising: growing in an aqueous nutrient medium, Schizomycetes organisms of the genus Propionibacterium and capable of producing *Ochromonas malhamensis*-activity; and disrupting the resulting bacterial cells in the substantial absence of light and cyanide ion.

13. A process for producing coenzyme $B_{12}$ comprising: growing in an aqueous nutrient medium, Schizomycetes organisms of the genus Streptomyces and capable of producing *Ochromonas malhamensis*-activity; and disrupting the resulting bacterial cells in the substantial absence of light and cyanide ion.

14. A process for producing coenzyme $B_{12}$ comprising: growing in an aqueous nutrient medium, Schizomycetes organisms of the genus Pseudomonas and capable of producing *Ochromonas malhamensis*-activity; and disrupting the resulting bacterial cells in the substantial absence of light and cyanide ion.

15. A process for producing benzimidazole coenzyme $B_{12}$ comprising: growing in an aqueous nutrient medium, containing benzimidazole, *Clostridium tetanomorphum* organisms capable of producing *Ochromonas malhamensis*-activity; and disrupting the resulting bacterial cells in the substantial absence of light and cyanide ion.

16. A process for producing coenzyme $B_{12}$ comprising: growing in an aqueous nutrient medium containing 5,6-dimethylbenzimidazole, *Clostridium tetanomorphum* organisms capable of producing *Ochromonas malhamensis*-activity; and disrupting the resulting bacterial cells in the substantial absence of light and cyanide ion.

No references cited.